United States Patent Office 3,422,841
Patented Jan. 21, 1969

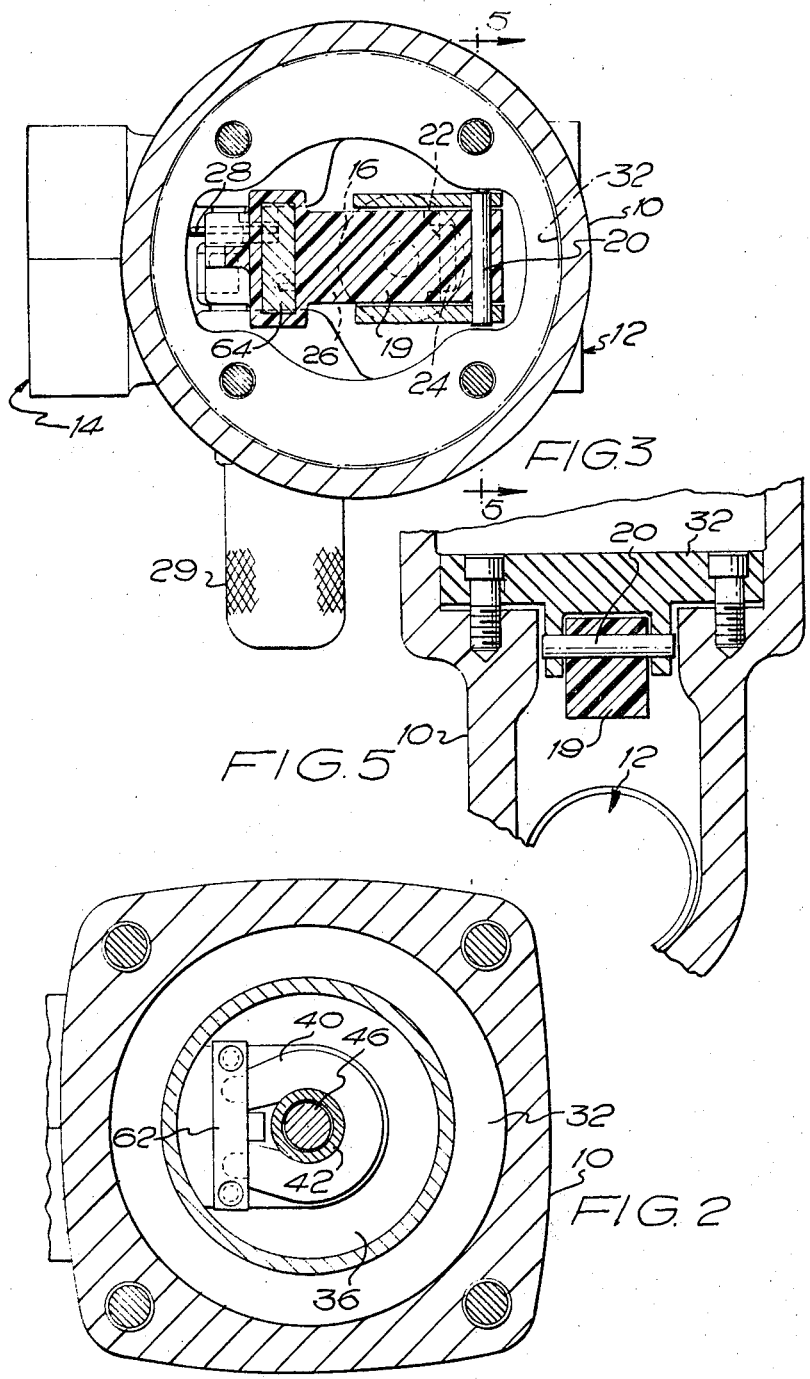

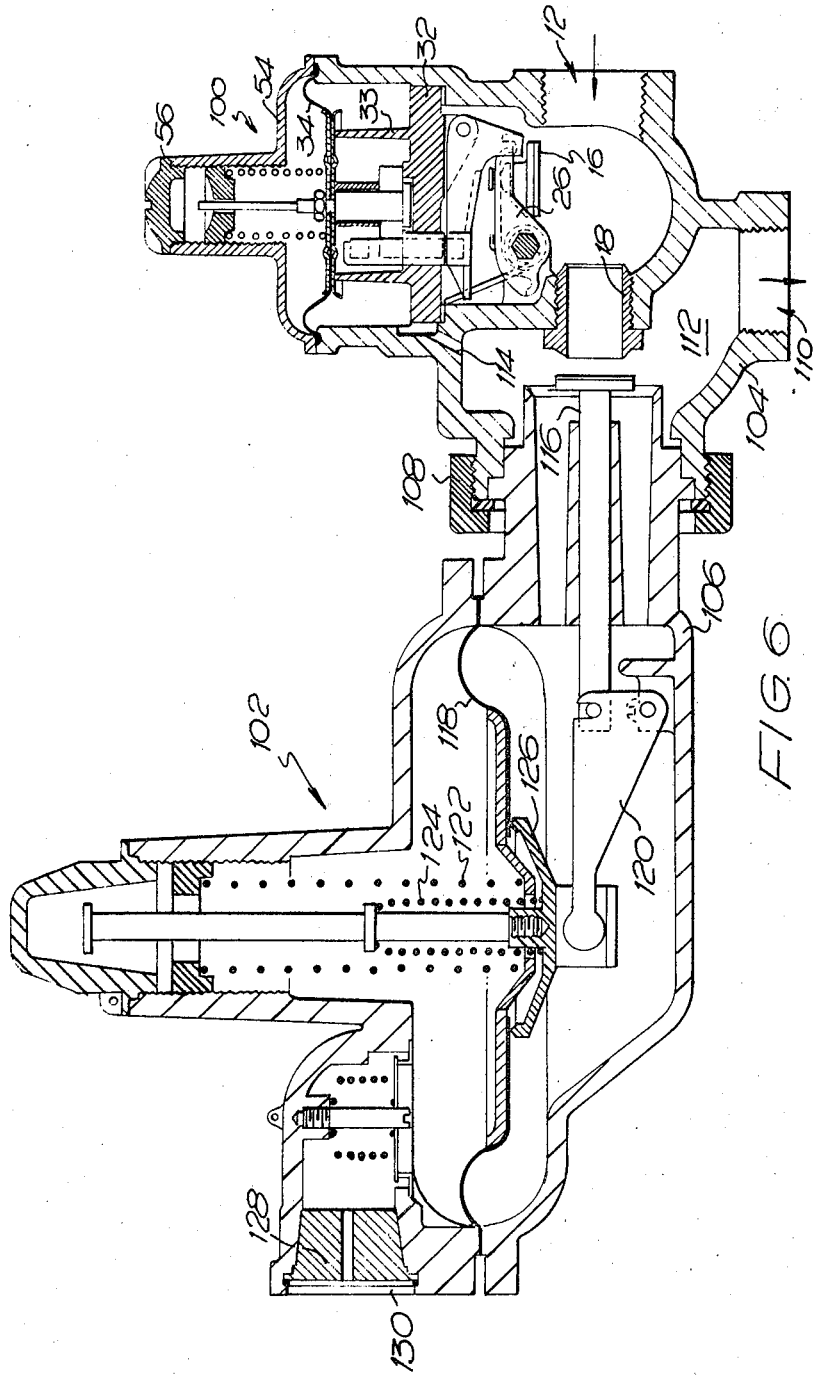

3,422,841
SAFETY CUT-OFF VALVES FOR GAS
SUPPLY SYSTEMS
Sydney Farrer, Sheffield, England, assignor to The Bryan Donkin Company Limited, Chesterfield, England, a company of Great Britain and Northern Ireland
Filed July 10, 1967, Ser. No. 652,316
Claims priority, application Great Britain, July 19, 1966, 32,346/66
U.S. Cl. 137—461     13 Claims
Int. Cl. F16k 17/06, 31/08

ABSTRACT OF THE DISCLOSURE

A safety cut-off valve for a gas supply system, the valve including a valve member mounted for movement towards or away from a valve seat and means for retaining said valve member in an inoperative position off said seat during normal operation, said means including a pair of fixed metallic contacts arranged to retain said valve member in said inoperative position when magnetically activated and a magnet movable under the control of a pressure responsive diaphragm towards or away from said contacts to magnetically activate or de-activate the latter.

---

The invention relates to safety cut-off valves for gas supply systems.

The object of the invention is to provide a safety cut-off valve which will operate satisfactorily after having been in service for many years.

According to the invention, a safety cut-off valve for a gas supply system includes a valve member mounted for movement towards or away from a valve seat and means for retaining said valve member in an inoperative position off said seat during normal operation, said means including a pair of fixed metallic contacts arranged to retain said valve member in said inoperative position when magnetically activated and a magnet movable under the control of a pressure responsive diaphragm towards or away from said contacts to magnetically activate or de-activate the latter. The valve member is preferably pivotally mounted and moves towards the valve seat under the force of gravity when released by the means for retaining it in its inoperative position, preferably assisted by a spring. Preferably, also, a detent mechanism is provided by means of which a mechanical advantage is obtained in retaining the valve member in its inoperative position. A lever of said detent mechanism preferably acts as a "keeper" when the contacts are magnetically activated. Means are preferably provided to hold said lever against the contacts to act as a "keeper" when, contrary to the usual conditions (as, for example, when the valve is in storage), the valve member is closed and yet the contacts are activated. A second "keeper" is preferably disposed so as to be contacted by the magnet when the contacts are de-activated. The magnet is preferably secured to the face of the pressure responsive diaphragm and is preferably disposed in a chamber in which a gauge pressure is caused to act against said diaphragm. A spring which acts upon said diaphragm in opposition to said gauge pressure is preferably preloaded to a determined extent by means of a screw-threaded adjustment. A spindle on which the valve member is mounted can preferably be turned by an extraneous handle to return said valve member to its inoperative position after it has closed onto the valve seat to cut off a supply of gas through the valve.

Figure 1:
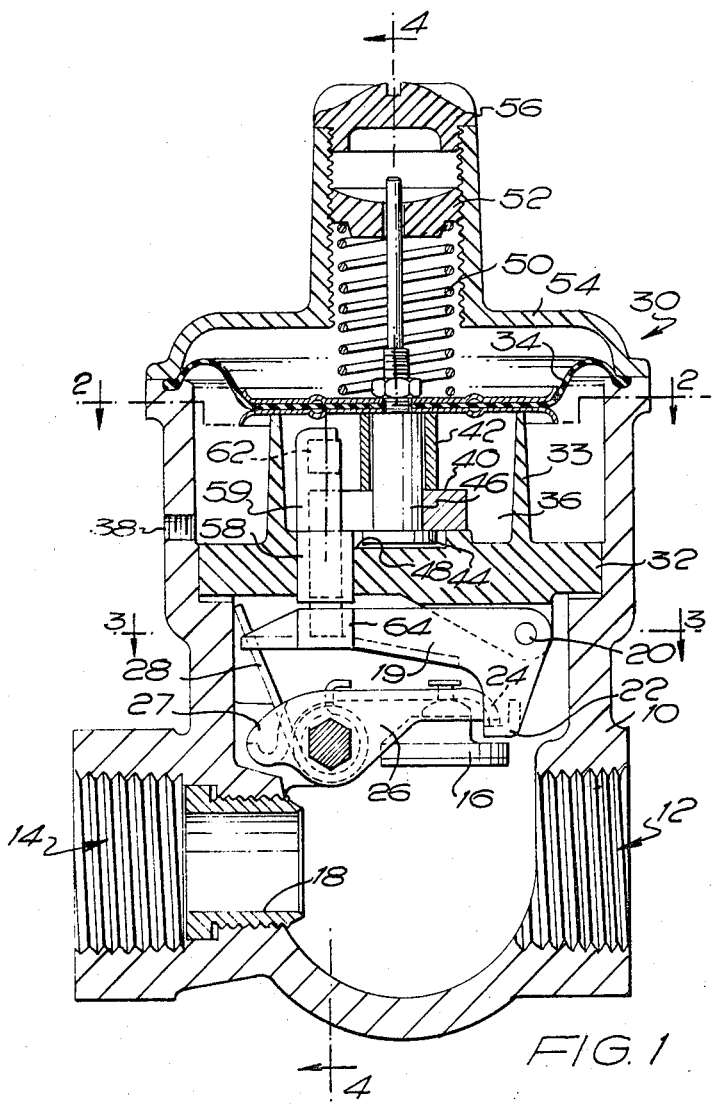
Figure 4:
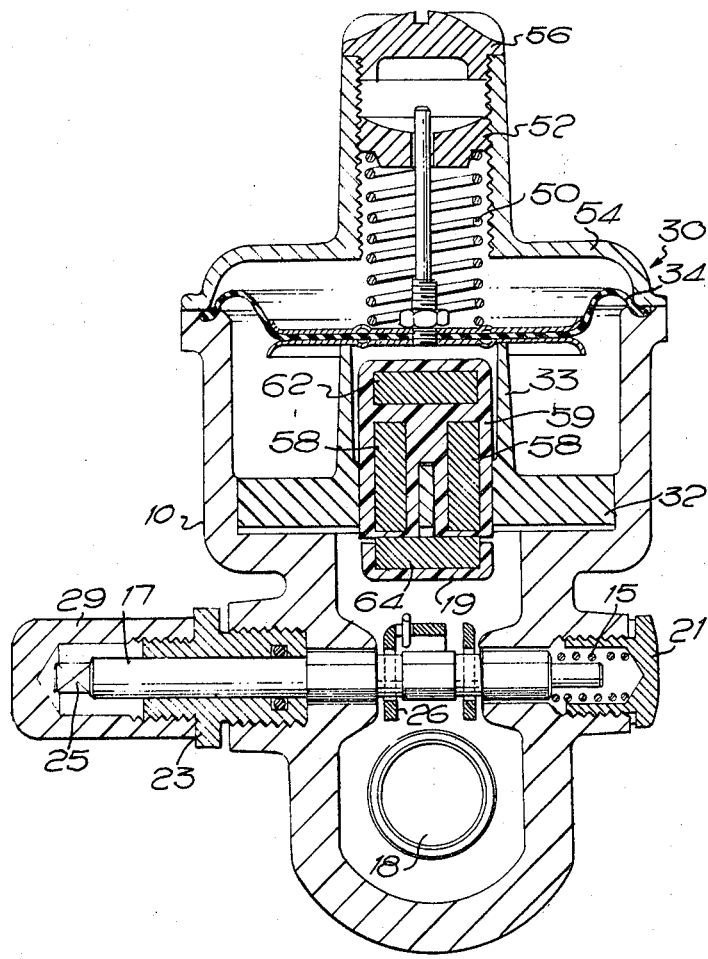

In order that the invention may be fully understood and readily carried into effect, a preferred embodiment thereof will now be described, by way of example only, with reference to the accompanying drawings, of which:

FIG. 1 is a sectional view of a safety cut-off valve embodying the invention,
FIG. 2 is a view on the line 2—2 in FIG. 1,
FIG. 3 is a view on the line 3—3 in FIG. 1,
FIG. 4 is a view on the line 4—4 in FIG. 3,
FIG. 5 is a view on the line 5—5 in FIG. 3, and
FIG. 6 is a sectional view illustrating a modified form of cut-off valve in combination with a conventional regulator valve.

Referring now to FIGS. 1–5 of the drawings, a safety cut-off valve for installation in a gas supply system includes a main body part 10 with co-axial inlet and outlet passages indicated 12 and 14 respectively. A valve member 16 is pivotally mounted within the body part as shown for movement towards or away from a valve seat which is constituted by one end of a liner 18 screwed into the outlet passage. A detent mechanism is also provided within the main body and co-operates with the valve member 16 when the latter has been raised to an inoperative position off the valve seat, as shown in full lines in the drawing. Said detent mechanism is constituted by a lever 19 pivotally mounted on a pivot pin 20, and said lever is provided with a latch portion 22 which co-operates with a tail piece 24 of an arm 26 on which the valve member is carried, to retain the latter in its inoperative position against the action of a torsion spring 28 which acts to close the valve. An extension 27 of the arm 26 is provided for a purpose which will presently be explained and a soft iron keeper 64 is mounted at the free end of the lever 19 and extends transversely thereof also for a purpose which will be presently explained.

The valve member 16 is pivotally mounted within the body 10 on a spindle 17 which is journalled in a plug 23. As can be seen in FIG. 4, the spindle 17 has been formed from hexagonal bar, and during normal operation of the valve, that is to say when the valve is open, cylindrical portions of said spindle are aligned with flanges of the arm 26 (through which hexagonal holes extend) so that said arm can pivot freely. Hexagonal portions of said spindle flank said flanges, however, and the spindle is retained in the position in which it is shown in the drawing by means of a compression spring 15 located in the blind bore of a plug 21. The spindle is provided with a squared end 25 by means of which it can be turned by an extraneous tool (not shown) to reopen the valve after the valve member has closed upon its seat and the arrangement is such that when it is desired to do this, the spindle 17 can be displaced against the force of the spring 15 to bring the hexagonal portions of said spindle into engagement with the similarly shaped holes in the flanges of the arm 26. A closure cap 29 is screwed on the end of the plug 23 to close and protect the end of the spindle.

A control unit generally indicated 30 is provided for causing the release of the valve member 16 in response to a rise above a predetermined maximum of a certain gauge pressure, and said unit includes an aluminum insert 32 which provides an impermeable wall between the upper and lower parts of the valve, that is to say between the control unit and the cavity containing the valve member 16. An upstanding wall 33 which forms part of the insert 32 is surmounted by a flexible diaphragm 34 overlying a cavity 36 formed within said wall. A screw-threaded aperture 38 is provided in the side of the casing for the reception of a pipe connection (not shown) by means of which the gauge pressure is conveyed to the valve from any convenient source.

A permanent magnet 40 is accommodated in the cavity 36 and is secured beneath the flexible diaphragm, spaced beneath the latter by means of a tubular distance piece 42. The head 44 of a spindle 46 on which the magnet is carried is accommodated in a recess 48 in the insert. A coil spring 50 overlies the diaphragm and acts against the force of the gauge pressure in the cavity 36 to urge the magnet downwards. Said spring re-acts against an abutment member 52 which can be adjustably positioned within a cover 54 overlying the casing so that the valve will cut off the supply of gas when a predetermined gauge pressure is reached. The abutment member is adjustable in a screwthread in the cover when a screw cap 56 has been removed.

In a lower position in which it is shown in FIG. 1, the poles of the magnet 40 contact the upper ends of a pair of soft iron plugs 58 which are moulded in a block of synthetic plastics material 59. The latter extends through the aluminium insert, providing an abutment surface for the soft iron keeper 64 mounted at the free end of the lever 19, and the soft iron plugs extend so very nearly to the underside of said block of synthetic plastics material that when magnetically activated by the magnet 40 they retain the lever 19 in the raised poistion. In an upper position to which it moves when the diaphragm is subjected to an excessive gauge pressure, the poles of the magnet are disconnected from the soft iron plugs 58 and contact a soft iron keeper 62 which is disposed some distance above the upper ends of said plugs, being also moulded in the block of synthetic plastics material and, like the upper ends of said plugs, being exposed at one side thereof.

In operation, when the valve is open as shown in the drawings and a gauge pressure lower than the predetermined maximum is present in the cavity 36, the soft iron plugs are magnetically activated by the magnet, that is to say, they transmit the magnetic flux from the magnet so that their lower ends become magnetic and retain the keeper 64 in a raised position which in turn causes the detent mechanism to retain the valve member in its inoperative position. It will be seen that the design of the detent mechanism is such that by virtue of the keeper 64 being disposed a greater distance from the pivot pin 20 than the hooked portion 22, there is obtained a mechanical advantage which overcomes any tendency for the valve member to break loose due to vibration.

When on the other hand a gauge pressure higher than the predetermined maximum is transmitted to the cavity 36, the magnet 40 is raised and breaks contact with the soft iron plugs 58 which are thus de-activated, allowing the keeper 64 together with the lever 19 to fall. With the release of the detent mechanism the valve member 16 closes under the action of the spring 28 assisted by its own weight. Just before breaking contact with the plugs 58, the magnet makes contact with the keeper 62 so that the plugs are magnetically short circuited and immediate closure of the valve results. A magnetic circuit is then maintained through the keeper and the magnet does not "waste away" if the valve is not re-opened for some time.

When it is desired to re-open the valve, the closure cap 29 is temporarily removed to allow the spindle to be rotated as previously described to bring the valve member into its raised inoperative position.

The extension 27 of the arm 26 is provided so that, for example, when the valve is in store and the valve member is in its closed position the keeper 64 is held in the magnetic field at the lower ends of said plugs and maintains a magnetic circuit. The magnet is thereby prevented from "wasting away."

It is thought that the safety cut-off valve just described will be an improvement over safety cut-off valves of known design, in particular that it will operate satisfactorily after having been in service for many years, which valves of known design sometimes do not. This is because in the valve just described, a connection is made from the control unit 30 to the detent mechanism retaining the valve member in its inoperative position by means which do not include a sliding spindle or the like passing from a zone of high pressure to a zone of lower pressure as is usual in various known designs. Such a sliding spindle arrangement usually requires sealing means surrounding the spindle to prevent the leakage of gas from the main body to the interior of the control unit and it is this sealing means which invariably gives trouble when due to dirt or moisture it causes the valve to stick after a certain period of service. This is a serious hazard which has sometimes prevented a safety cut-off valve of known design from operating in an emergency. In a valve embodying the present invention, of course, the soft iron plugs 58 are not required to move and consequently they are hermetically sealed on assembly so that leakage cannot possibly occur during service. Furthermore it will be seen that the valve has "fail-safe" characteristics since if the magnet should lose its power after the valve has been in service for many years it will allow the valve member to close and shut off the supply of gas.

Referring now to FIG. 6, this illustrates a cut-off valve embodying the invention and generally indicated 100 in combination with a conventional regulator valve generally indicated 102. The cut-off valve is basically the same as that described with reference to FIGS. 1–5 save to say that the body has been formed integrally with an adaptor part 104 by means of which it has been secured to a body part 106 of the regulator valve, as shown, by a screwed collar 108. An outlet 110, in effect from the regulator, opens from a cavity 112 on the regulator side of the liner 18 and a port 114 extends between the cavity 112 and the cavity beneath the flexible diaphragm of a cut-off valve so that gauge pressure can communicate with said valve from the regulator.

As will be seen, the regulator is of the type having a horizontally movable control valve member 116 and this is movable towards or away from the end of the liner 18 in the outlet passage of the cut-off valve to control the amount of gas flowing into the cavity 112. The pressure of gas in the cavity 112 communicates with a space at the underside of a flexible diaphragm 118 and movements of said diaghragm in response to changes of pressure in said cavity control the setting of said control valve member, by means of a lever 120, to maintain said pressure substantially constant. The diaphragm is acted upon by a spring 122 which can be adjusted in known manner to pre-determine the pressure of gas delivered from the regulator. A further spring 124 which to pre-set acts against a relief valve 126 which is built into the diaphragm, and if an excessive build-up of pressure occurs beneath said diaphragm, due perhaps to the presence of grit on the mating surfaces between the liner 18 and the control valve 116, the relief valve opens to allow the leaf-off of gas through a tiny hole 128 in a plug 130 of the regulator.

When a reliable cut-off valve is associated with a regulator valve to take over its normal function. In a further relief valve. However, depending upon the particular application, it may be preferable in certain circumstances to allow a very gradual build-up of pressure to leak-off to atmosphere rather than to rely on the cut-off valve shutting off the supply and requiring to be subsequently re-opened.

Various other modifications may be made without departing from the scope of the invention. For example, in a relatively large cut-off valve the valve member 16 could be provided with a pilot valve which would be opened to pressure balance the valve member 16 when re-establishing a supply of gas after shut-off. In this way the manual effort required would be reduced. A further advantage which would result from such a modification would lie in the fact that after shut-off and a subsequent substantial drop in pressure on the output side of the valve, re-opening of the valve would not result in a sudden surge of gas (which could, of course, re-trip the cut-off action) but would be preceded by a gradual build-up of pressure at its output side, allowing the normal regulator valve to take over its normal function. In a further modification, the exposed metal parts of the magnetic circuit may have a thin coating of lacquer to prevent corrosion.

It will also be understood that although the valve just described closes in response to a rise in gauge pressure above a certain predetermined maximum, it could quite well be modified so as to close in response to a pressure drop below a predetermined minimum or indeed in response to an excessive pressure differential between two gauge points, one pressure communicating with the space below the flexible diaphragm and the other pressure communicating with the (then enclosed) space above said diaphragm.

What I claim is:

1. A safety cut-off valve for a gas supply system, the valve including a valve member mounted for movement towards or away from a valve seat, a pair of fixed metallic contacts arranged to retain said valve member in an inoperative position off said valve seat when magnetically activated, a pressure responsive diaphragm, and a magnet movable under the control of said diaphragm towards or away from said contacts to magnetically activate or de-activate said contacts.

2. A safety cut-off valve according to claim 1, wherein the valve member is pivotally mounted and moves towards the valve seat under the force of gravity when released by the means for retaining it in its inoperative position.

3. A safety cut-off valve according to claim 2, wherein the movement of the valve member towards the valve seat is effected or assisted by a spring when released by the means for retaining it in its inoperative position.

4. A safety cut-off valve according to claim 3, wherein a detent mechanism is provided by means of which a mechanical advantage is obtained in retaining the valve member in its inoperative position.

5. A safety cut-off valve according to claim 4, wherein a lever of the detent mechanism acts as a "keeper" when the contacts are magnetically activated.

6. A safety cut-off valve according to claim 5, wherein means are provided to hold the lever against the contacts to act as a "keeper" when, contrary to the usual conditions (as, for example, when the valve is in storage), the valve member is closed and yet the contacts are activated.

7. A safety cut-off valve according to claim 5, wherein a second "keeper" is disposed so as to be contacted by the magnet when the contacts are de-activated.

8. A safety cut-off valve according to claim 7, wherein the magnet is secured to the face of the pressure responsive diaphragm.

9. A safety cut-off valve according to claim 8, wherein the magnet is disposed in a chamber in which a gauge pressure is caused to act against the pressure responsive diaphragm.

10. A safety cut-off valve according to claim 9, wherein a spring which acts upon the pressure responsive diaphragm in opposition to a gauge pressure is pre-loaded to a determined extent by means of a screw-threaded adjustment.

11. A safety cut-off valve according to claim 10, wherein a spindle on which the valve member is mounted can be turned by an extraneous handle to return said valve member to its inoperative position after it has closed onto the valve seat to cut off a supply of gas through the valve.

12. A safety cut-off valve according to claim 11, wherein the valve member is normally freely pivotable upon the spindle on which it is mounted, means being provided whereby the spindle can be engaged with said valve member when it is desired to return the latter to its inoperative position.

13. In combination, a safety cut-off valve according to claim 12 and a conventional regulator valve.

References Cited

UNITED STATES PATENTS

| 867,003 | 1/1908 | Schulze | 137—465 |
| 960,569 | 6/1910 | Moon | 137—463 XR |
| 2,587,358 | 2/1952 | McRae | 137—463 |
| 2,924,235 | 2/1960 | Knudsen | 137—461 |
| 3,228,417 | 1/1966 | Schwerter | 137—461 |

HAROLD W. WEAKLEY, Primary Examiner.

U.S. Cl. X.R.

137—463, 505.46; 251—65, 73